Patented Sept. 9, 1952

2,610,113

UNITED STATES PATENT OFFICE 2,610,113

MOISTURE CONTROL OF SOLIDIFIED FUEL

Karl A. Fischer, Washington, D. C., and Otto F. Hecht, Philadelphia, Pa., assignors to the United States of America as represented by the Secretary of the Army No Drawing. Application June 14, 1949, Serial No. 99,105

11 Claims. (Cl. 44—7)

(Granted under the act of March 3, 1883, as amended April 30, 1928; 370 O. G. 757)

The invention described herein, if patented, may be manufactured and used by or for the Government for governmental purposes, without the payment to us of any royalty thereon.

This invention relates to moisture control of solidified fuel, and more particularly to the stabilization of a solidified gel structure containing dispersed hydrocarbon droplets.

The solidification of liquid hydrocarbon fuels by emulsifying the same in alginic acid or in a water-soluble salt of alginic acid, followed by congealing in an aqueous solution of a calcium salt has been described in the foreign patent literature, e. g. in British Patent No. 450,206, De Granville, and British Patent No. 481,392, Pouettre. The solidified bodies obtained by the methods set forth in these patents burn with a slow flame without exploding, and are reconverted into liquid hydrocarbon fuel by squeezing, shredding, or similar mechanical operations.

Alginic acid is a polymeric substance found in nature and has up to now defied synthesis. The solidified gel structure in which the liquid hydrocarbon fuel is dispersed as tiny droplets consequently is postulated to be a water-insoluble polymeric calcium complex. This calcium complex is formed in accordance with the above cited patent literature by the reaction of alginic acid or sodium alginate (which forms the continuous phase of the hydrocarbon emulsion) with a calcium salt such as calcium chloride or calcium nitrate.

Our co-pending application Serial No. 99,107, filed concurrently, entitled "Solidification of Liquid Fuel," describes the formation of a solidified hydrocarbon gel by emulsifying liquid hydrocarbon fuel in an aqueous solution of a water-soluble polymeric substance characterized by repeating vinyl (CH₂:CH—) groups (such as alkali and other monovalent salts of polyacrylic acid, polymeric crotonic acid or polymeric vinyl actic acid, e. g., sodium polyacrylate, potassium polyacrylate, ammonium polyacrylate, sodium polyvinyl acetate, sodium polycrotonate); the dispersant phase of the thus formed emulsion is solidified and rendered substantially water-insoluble by introducing it (preferably dropwise) into a congealing bath consisting, e. g. of a 10% (or stronger) aqueous solution of calcium chloride. The congealing bath converts the dispersant outer phase of the emulsion into pellet-shaped gels whose outer phase is postulated to be a substantially hydrocarbon-insoluble and water-insoluble calcium complex formed by replacement of the monovalent, e. g. sodium or ammonium ions with calcium ions.

A drawback of the solidified hydrocarbon fuels prepared in accordance with the above-summarized procedures is that in the course of prolonged storage, they liberate liquid, chiefly water. When the moisture loss progressess too far, hydrocarbon vapors are then released in considerable quantity; and this causes a substantial storage loss factor.

The explanation for this phenomenon is believed to be that increase in dehydration of the solidified fuels causes deformation of the spheric cells of the solidified emulsion. Consequently, a larger surface is required for the incasing shells which to a certain extent can be provided by elastic elongation. There exists a critical limit beyond which the cell walls cannot take the stress, resulting in a breakdown of the closed cell structure, which now provides an open outlet for the hydrocarbons through cracks and fissures. A certain minimum quantity of water must therefore be maintained in the gels to keep them gasoline-tight.

We have found, that certain water-soluble and highly hygroscopic organic compounds are capable of imparting to the gels the property of retaining a controlled amount of moisture. Such substances are the water-soluble hygroscopic polyhydric alcohols (and their water-soluble hygroscopic ethers), e. g. glycol, glycerol, diethylene-glycol, the "Carbitols" (diethylene-glycol alkyl monoethers, such as diethylene-glycol monomethyl ether, diethylene-glycol monoethyl ether, diethylene-glycol butyl ether, etc.), 1,1,1-trimethylolethane, 1,1,1-trimethylolpropane, hexanetriol, butanediol, tetrahydroxybutane (in solution), pentaerythrite.

The hygroscopic polyhydric alcohols retard evaporation of water from the gasoline-retaining solidified gel structure, by lowering the vapor pressure and causing stronger adsorption of the water in the gel structure. They also limit evaporation to the percentage at which vapor pressure is in equilibrium with the humidity of the surrounding atmosphere. The optimum amount of polyhydric alcohol to be incorporated in the gel structure therefore varies with the climatic conditions of the area where the solidified fuel is expected to be stored; thus, where storage is expected to take place in a wet and/or cold climate, less polyhydric alcohol need be added than for a dry and/or hot climate.

Thus, it is an object of our invention to provide a stabilized solidified hydrocarbon-fuel-containing gel structure, whose moisture content is controlled for optimum stability characteristics.

Another object of our invention is a method whereby a stabilizer may be incorporated in a liquid-hydrocarbon-supporting solidified gel for storage in the open under rigorous climatic conditions.

A further object of our invention is the prevention of the evaporation-caused breakdown of gasoline-containing cells in a solidified fuel, by the addition of inexpensive industrial organic compounds.

Still another object is the provision of a moisture-stable solidified dispersed-hydrocarbon-containing gel structure, capable of retaining a higher percentage of dispersed hydrocarbon than has been heretofore possible.

Other objects and advantages of our invention will appear from the following detailed description of a preferred manner carrying the same into practice.

We prefer to add the hygroscopic polyhydric alcohol stabilizer prior to the solidification of the gel structure (which solidification, as has been pointed out above, takes place by congealing in a calcium salt bath). Thus, it is advantageous to add an appropriate amount of hygroscopic polyhydric alcohol to the liquid emulsifying substance such as sodium alginate or sodium acrylate (or other water-soluble alkyl metal salts characterized by repeating vinyl groups), and thereafter dispersing therein a liquid hydrocarbon; the liquid emulsion is then solidified by precipitation in the calcium salt bath (e. g. 10% solution of calcium chloride) whereby the outer phase of the dispersion is converted into a stabilized water-insoluble and substantially hydrocarbon insoluble complex in pellet form or other desired shape.

The following specific examples further illustrate methods of carrying our invention into practice by adding hygroscopic polyhydric alcohols (or their water-soluble hygroscopic ethers) to the hydrocarbon-emulsifying substances for the purpose of controlling the moisture evaporation characteristics of the subsequently stabilized gel structure; it will be understood, however, that our invention may be carried out by the use of other chemicals, as are set forth in this specification, than those specifically mentioned in the examples.

*Example 1*

To a 2% aqueous solution of a sodium polyacrylate (e. g., the commercial compound sold by Rohm and Haas under the name of "RHotex") is added approximately 5% of glycerol. An approximately equal volume of commercial gasoline (e. g. a hydrocarbon mixture whereien heptane predominates) is then emulsified therein by stirring; and the resulting emulsion is introduced in a rapid succession of drops into a 10% aqueous solution of calcium chloride, wherein it immediately gels in the form of pellets of substantially uniform size. The pellets are thereupon subjected to "aging" that is, they are permitted to give off an initial amount of moisture and gasoline vapor in an enclosed chamber equipped with gasoline vapor recovering means, and then are ready for open air storage. The loss of additional moisture and gasoline vapor after "aging" is quite small.

*Example 2*

A 5% amount of "Carbitol" (diethylene-glycol monoethyl ether) is added to a 2% aqueous solution of sodium alginate (e. g. a 60:40 mixture of a high molecular weight sodium alginate sold under the name of "Kelgin" and of a low molecular weight sodium alginate sold under the name of "Kelgum"). An approximately equal volume of commercial gasoline is then emulsified in this liquid, and the emulsion is congealed, as described in Example 1. The resulting gel is subjected to "aging" and thereafter possesses the same stability characteristics as the gel produced in accordance with Example 1.

*Example 3*

Glycerol is used in the procedure of Example 2, instead of "Carbitol," in an amount of approximately 5% of the aqueous solution of sodium polyacrylate. The stabilization of the hydrocarbon-containing solidified gel proceeds as in Example 2; and the results are substantially the same.

The percentage figures of the hygroscopic stabilizers mentioned in the preceding examples are suitable for average climatic conditions; where storage in dry climates is contemplated, it may be necessary to increase the amount of stabilizer; thus, for storage in hot and dry regions 10–15% glycol instead of the 5% of Example 1 may be added to the emulsifying solution. Conversely, for storage of the solidified gel in wet climates, a smaller amount of stabilizer will still result in the formation of a gel that remains stable in open air storage.

Likewise, the concentration of the polyvinyl compound (e. g. polyacrylate) or alginate solution prior to addition of the stabilizer may be suitably varied, e. g. in the case of sodium polyacrylate a 1% solution may be used, and in the case of sodium alginate solutions within the range of ½%–3% have given good dispersion results. The relative proportions by volume of emulsifying solution and liquid hydrocarbon are likewise susceptible to suitable variations. By adding polyhydric hygroscopic alcohol stabilizers in accordance with the present invention, a stable gel containing as much as 75% (by volume) dispersed liquid hydrocarbon can be obtained.

The term "water-soluble hygroscopic polyhydric alcohol" as used by us herein, is deemed to encompass also the water-soluble hygroscopic ethers of polyhydric alcohols.

Variations from and modifications of the examples of our invention, above set forth, will readily occur to the expert without, however, departing from the spirit of our invention. Such variations and modifications are therefore to be deemed with the scope of our invention, which we define by the appended claims.

We claim:

1. The process of making a stable solidified hydrocarbon gel, comprising emulsifying liquid hydrocarbon in an aqueous solution of (1) a water-soluble substance selected from the group consisting of water-soluble salts of alginic acid and water-soluble salts characterized by repeating —$CH_2.CH<$ groups and (2) in an amount of from about ½% to about 15% of said aqueous solution, a substance selected from the group consisting of a water-soluble hygroscopic polyhydric alcohol and a water-soluble hygroscopic ether of a polyhydric alcohol, and reacting the dispersant phase of said emulsion with an aqueous solution of a calcium salt to convert said phase into a water-insoluble and hydrocarbon-insoluble stabilized calcium complex.

2. The process of making a stable solidified hydrocarbon gel, comprising emulsifying liquid hydrocarbon in a solution of (1) a water-soluble substance selected from the group consisting of water-soluble salts of alginic acid and water-soluble salts characterized by repeating $$-CH_2.CH<$$

groups and (2) in an amount of about 5% of said aqueous solution, a substance selected from the group consisting of a water-soluble hygroscopic polyhydric alcohol and a water-soluble hygroscopic ether of a polyhydric alcohol, and reacting the dispersant phase of said emulsion with an aqueous solution of a calcium salt, to convert said phase into a water-insoluble and hydrocarbon-insoluble stabilized calcium complex.

3. A stable solidified hydrocarbon body comprising a dispersion of a liquid hydrocarbon in a gelled dispersant phase essentially comprising a substantially hydrocarbon-insoluble and water-insoluble calcium complex and a stabilizing substance selected from the group consisting of a water-soluble hygroscopic polyhydric alcohol and a water-soluble hygroscopic ether of a polyhydric alcohol.

4. A stable solidified hydrocarbon body comprising a dispersion of a liquid hydrocarbon in a gelled dispersant phase essentially comprising a water-soluble hygroscopic polyhydric alcohol and a substantially hydrocarbon-insoluble and water-insoluble calcium complex.

5. A stable solidified hydrocarbon body comprising a dispersion of liquid hydrocarbon in a gelled dispersant phase essentially comprising a water-soluble hygroscopic ether of a polyhydric alcohol and a substantially hydrocarbon-insoluble and water-insoluble calcium complex.

6. A stable solidified hydrocarbon body comprising a dispersion of a liquid hydrocarbon in a gelled dispersant phase essentially comprising a substantially hydrocarbon-insoluble and water-insoluble calcium alginate complex and a stabilizing substance selected from the group consisting of a water-soluble hygroscopic polyhydric alcohol and a water-soluble hygroscopic ether of a polyhydric alcohol.

7. A stable solidified hydrocarbon body comprising a dispersion of a liquid hydrocarbon in a galled dispersant phase essentially comprising a substantially hydrocarbon-insoluble and water-insoluble calcium complex characterized by repeating $-CH_2.CH<$ groups and a substance selected from the group consisting of a water-soluble hygroscopic polyhydric alcohol and a water-soluble hygroscopic ether of a polyhydric alcohol.

8. A stable solidified hydrocarbon body comprising a dispersion of a liquid hydrocarbon in a gelled dispersant phase essentially comprising glycerol and a substantially hydrocarbon-insoluble and water-insoluble calcium complex.

9. A stable solidified hydrocarbon body comprising a dispersion of a liquid hydrocarbon in a gelled dispersant phase essentially comprising glycol and a substantially hydrocabron-insoluble and water-insoluble calcium complex.

10. A stable solidified hydrocarbon body comprising a dispersion of a liquid hydrocarbon in a gelled dispersant phase essentially comprising a diethylene-glycol alkyl ether and a substantially hydrocarbon-insoluble and water-insoluble calcium complex.

11. A stable solidified hydrocarbon body comprising a dispersion of a liquid hydrocarbon in a gelled dispersant phase essentially comprising diethylene-glycol ethyl ether and a substantially hydrocarbon-insoluble and water-insoluble calcium complex characterized by repeating $$CH_2.CH<$$

groups.

KARL A. FISCHER.
OTTO F. HECHT.

REFERENCES CITED

The following references are of record in the file of this patent:

UNITED STATES PATENTS

| Number | Name | Date |
| --- | --- | --- |
| 1,982,662 | Hodson | Dec. 4, 1934 |
| 2,443,378 | Dittmar et al. | June 15, 1948 |

FOREIGN PATENTS

| Number | Country | Date |
| --- | --- | --- |
| 450,206 | Great Britain | July 13, 1936 |
| 481,392 | Great Britain | Mar. 10, 1938 |
| 580,885 | Great Britain | Sept. 24, 1946 |

OTHER REFERENCES

Carbide and Carbon Chemicals Corp., "Synthetic Organic Chemicals"—12th Ed.—July 1, 1945—pp. 14–23.